Dec. 20, 1966   R. W. COOK   3,293,150
APPARATUS FOR RECOVERING ESSENCE-BEARING VAPORS
Filed Nov. 30, 1960
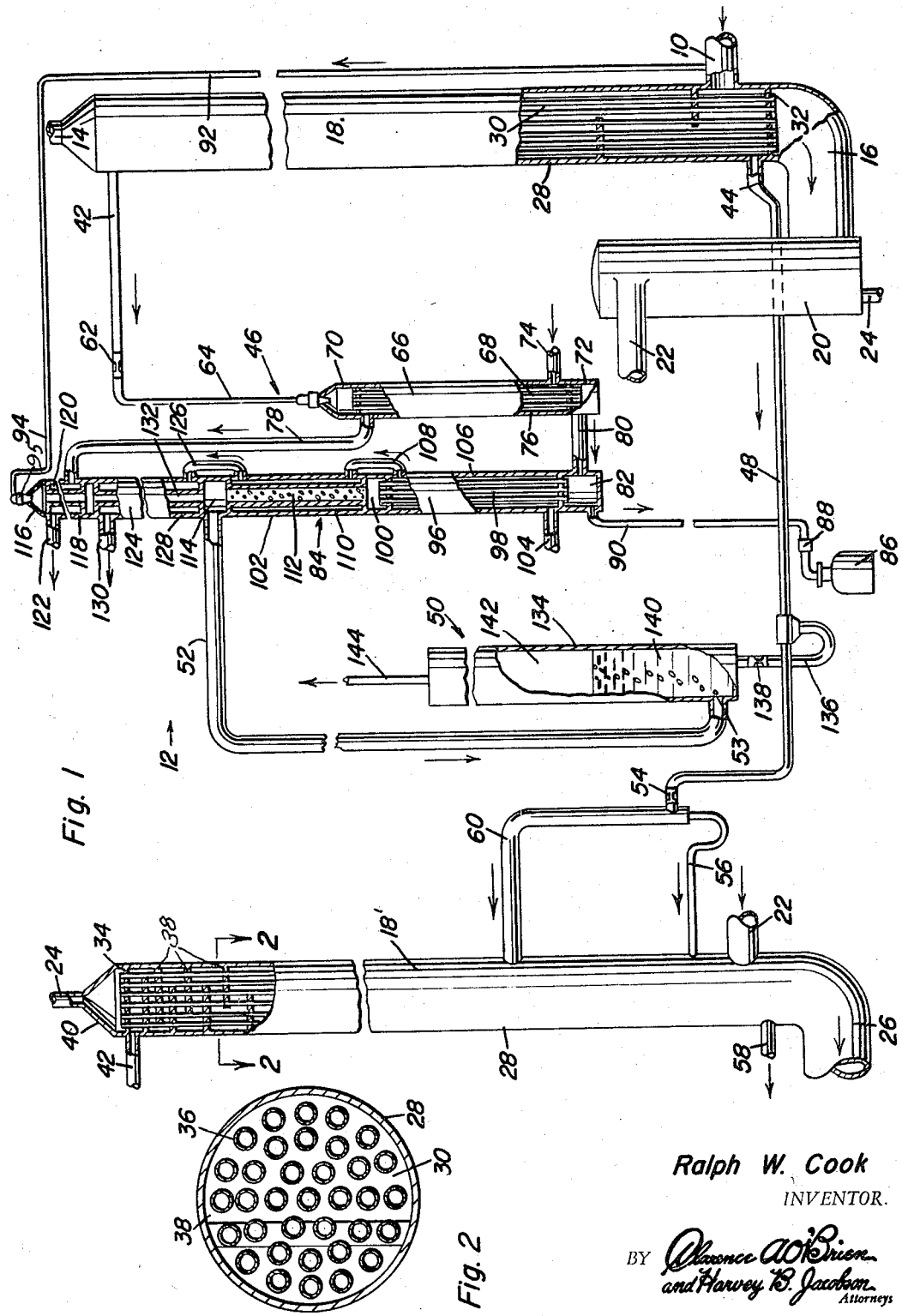
Ralph W. Cook
INVENTOR.

United States Patent Office 3,293,150
Patented Dec. 20, 1966

3,293,150
APPARATUS FOR RECOVERING ESSENCE-BEARING VAPORS
Ralph W. Cook, 311 Main St., Dunedin, Fla. 33528
Filed Nov. 30, 1960, Ser. No. 72,708
3 Claims. (Cl. 202—160)

This invention pertains to a multi-stage process and apparatus for recovering flavor concentrates from essence bearing vapors separated from vapor stripped feed liquid.

In the processing of fruit juices or liquids in order to reduce the liquids into a concentrate of non-volatiles for storage and subsequent reconstitution and consumption, considerable efforts and equipment are involved in recovering the flavor bearing materials released from the liquid being concentrated. Accordingly, in previous processes the concentrated vapor stripped fruit juice is chilled and delivered to a receiver while the essence bearing vapor and condensate are delivered to a flavor concentrate recovery section wherein they are stripped of the flavor concentrate. The recovery equipment includes a plurality of pumps, condensers, coolers, fractionating columns and reboilers necessary to concentrate the flavor bearing portion of the vapor. Additional equipment is also involved in scrubbing the vent gases exiting from the fractionating columns for recirculation of recovered volatiles through the fractionating columns. The recovery process of this invention, however, eliminates the expense and operational instability involved by use of the recovery equipment of prior processes by utilizing the stripped liquid in a heat exchange operation, which stripped liquid is otherwise removed from the system without being used in any manner in conjunction with the flavor concentration. Also, a novel pressure regulating system is utilized in the recovery process of this invention which in conjunction with the circulation of the stripped liquid through the concentrating section enables the separation from the essence bearing vapor, of the flavor concentrate which is delivered to the stripping column after being further condensed to remove the majority of condensibles therefrom which condensibles form part of the flavor concentrate delivered to a flavor concentrate container. A reflux liquid is also delivered in counter current flowing relation to the essence bearing non-condensibles for filtering through the stripping column so as to form part of the flavor concentrate. The stripping column accordingly delivers non-condensible, flavor free waste gas to a pressure regulator which not only vents the non-condensible gas but creates a predetermined pressure differential between the vapor inlet and non-condensible gas discharge causing vapor flow through the recovery stage. Further, the use of the vapor stripped feed liquid in heat exchanging relation to the essence bearing vapor for concentration thereof eliminates the need of reboilers or other heat sources or the large condensers otherwise necessary in previous processes for concentrating the essence bearing vapor. Also, by virtue of the use of the flavor concentrate stripping equipment including vapor fraction and reflux condensers interconnected below and above the stripping column respectively, reflux vapor may be delivered to the stripping equipment eliminating reflux splitting equipment and simplifying the vent gas scrubber equipment as heretofore used. The recovery equipment of this invention includes the use of metering nozzles for determining the flow rate of vapors into the flavor recovery section to provide a constant rate of flow therethrough for operational stability purposes.

It is therefore a primary object of this invention to provide a recovery process and apparatus for concentrating volatile flavorful material from the essence bearing vapor separated from feed liquids in a multistage liquid concentrating system.

A further object of this invention is to provide a volatile flavorful concentrate recovery process utilizing a heat exchanger providing baffled flow for the essence bearing vapor in heat exchanging relation to the vapor stripped feed liquid for concentrating the essence bearing vapor and thereby eliminating the need for expensive heating and condensing equipment which characterized previous processes by means of which the essence bearing vapor and condensate are concentrated with respect to the volatile flavor bearing materials.

An additional object of this invention is to provide a flavor concentrate recovery system for providing a constant and predetermined flow of the flavor concentrated vapor and reflux fluids into the recovery section to provide operational stability.

Another object of this invention is to provide a vacuum pressure regulating device for a flavor concentrate recovery system which will provide a constant predetermined pressure drop between the essence bearing vapor inlet and waste gas outlet vent in order to provide a desired flow of vapor through the recovery system.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a schematic illustration with parts shown in section, of the apparatus and the flow paths which characterize the novel process of this invention.

FIGURE 2 is a sectional view taken through a plane indicated by section line 2—2 of FIGURE 1.

In the foregoing objects and in the following detailed description of the invention, several terms are used having definite meanings to those skilled in the art to which the present invention pertains. Some of these terms are defined as follows:

Essence.—A concentrated solution of volatile flavor producing constituents.

Non-condensibles.—Gases which are found entrained in the liquid or juices which are not condensible under existing conditions.

Stripping.—The removal of volatile flavored constituents.

Referring now to the drawings in detail, it will be observed from FIGURE 1 that the process of this invention may constitute a portion of a multistage operation wherein the essence bearing vapor phase separated from a feed liquid or fruit juice in a conventional manner enters the vapor inlet 10 of the recovery stage generally indicated by reference numeral 12 while the vapor stripped feed liquid also separated, instead of being stored in an inactive state as in prior processes, enters inlet 14 into the recovery stage 12. The essence bearing vapor entering the vapor inlet 10 and the stripped liquid phase entering the liquid inlet 14 is therefore derived from an initial stage of a multistage essence recovery system in which initial stage the liquid is stripped. An outlet conduit 16 is therefore provided for a liquid vapor mixture resulting from the partially vaporized volatile flavor stripped feed liquid being discharged from the heat exchanger 18 of the recovery stage 12. Outlet conduit 16 is connected to the second stage separator 20 of conventional design whereby the liquid vapor mixture delivered thereto from conduit 16 is separated into a vapor discharged from the separator 20 by the vapor outlet conduit 22 and a further concentrated liquid delivered by the separator 20 through the stripped liquid outlet 24. It will therefore be understood, that in an essence recovery stage of the system, the stripped feed liquid is further partially evaporated so that the final stage of the system will produce any desired concentration possible for stripped feed liquid. The flavor bearing vapor delivered to the inlet conduit 10 thus represents some predetermined percentage of the feed liquid while the vapor delivered from the separator 20 to conduit 22 represents an additional percentage of the vapor released from the stripped feed liquid. The vapor delivered by conduit 22 therefore may enter a following stage heat exchanger 18' while the stripped feed liquid leaving the separator 20 through the conduit 24 may be delivered to the top of said following stage heat exchanger 18' for further partial evaporation thereof into a liquid vapor mixture delivered by outlet conduit 26 to the separator for the third stage not illustrated. Each stage will therefore further evaporate the feed liquid until the desired liquid concentration is obtained. During each stage however, the vapor released from the stripped feed liquid may pass through a concentrating section such as indicated in FIGURE 1.

It will be observed that each recovery heat exchanger 18 or 18' includes a vertically disposed cylindrical tank 28 forming a cylindrical vertical chamber 30 between an enclosed lower end 32 and upper end 34. A plurality of conduits 36 are supported within the chamber 30 in parallel spaced relation to each other, said conduits extending completely through the chamber 30. It will also be observed that the conduits 36 while providing passages which are not in communication with the chamber space 30, do provide a large heat exchanging surface area between the fluids passing through the conduits 36 and the fluids passing through the vertical chamber 30. The chamber 30 contains a plurality of baffle plates 38 which extend radially inward from opposite sides of the chamber wall in staggered and vertically spaced relation to each other. It will also be observed that the vertical spacing between the baffle members 38 are progressively reduced in an upward direction between the bottom end 32 and upper end 34 of the chamber 30, while the lengths of the baffles progressively increase. The upper ends of the conduits 36 are therefore in communication with the liquid inlet 14 or 24 by means of an inlet section 40 mounted above the chamber tank 28. The lower ends of the conduits 36 are also in communication with the outlet conduit 16. With regard to the chamber space 30, it will be observed that the vapor inlet conduit 10 is in communication therewith adjacent the bottom of the chamber 30 while an outlet concentrated vapor fraction conduit 42 is in communication with the chamber 30 adjacent the upper end thereof.

From the foregoing description of the heat exchanger 18 or 18' it will be appreciated that essence bearing vapor entering the chamber 30 from the vapor inlet 10 or 22 when drawn upwardly through the chamber 30 will undergo baffled flow the baffling of which progressively increases as the vapor rises in the chamber 30 until it is delivered out of the vapor outlet 42. As the vapor passes upwardly it is in contact with the surfaces on the plurality of conduits 36 through which the feed liquid containing non-volatile flavor constituents from the liquid inlet 14 or 24 and passes downwardly toward the outlet 16 or 26. Accordingly, the upwardly moving essence bearing vapor within the chamber 30 is partially condensed into a condensate withdrawn from the chamber 30 by the condensate outlet 44 which condensate moves downwardly through chamber 30 counter current to the upwardly moving vapors. The vapor outlet 42 therefore withdraws from the chamber 30 a more concentrated flavor bearing vapor fraction including the desired flavor volatiles and noncondensibles.

The concentrated flavor bearing vapor fraction is then delivered by the outlet conduit 42 to the flavor concentrate recovery stage 46 of the recovery section 12 while the condensate may be delivered by conduit 48 connected to the condensate outlet 44 to the following stage of the system. It will therefore be observed that a pressure regulating device generally indicated by reference numeral 50 is provided and operatively interconnected between the condensate conduit 48 and the discharge conduit 52 from the flavor concentrate recovery section 46 for the purpose of providing a constant pressure differential of sufficient value to cause vapor to flow upwardly through the chamber 30 of the heat exchanger 18 into the outlet conduit 42 for passage through the recovery section 46. The condensate in the conduit 48 at the same time may pass through a throttling orifice 54 whereby it flashes into a mixture of vapor and liquid, the liquid portion of which is delivered by conduit 56 to the following stage heat exchanger 18' adjacent the bottom thereof but preferably above the condensate outlet 58 of the heat exchanger 18' so that any remaining vapor may be released from the liquid condensate delivered by the conduit 56. The vapor portion released from the condensate delivered by conduit 48 to the throttling orifice 54 is delivered by conduit 60 to the chamber 30 of the recovery heat exchanger 18' at a point disposed above the vapor inlet 22 inasmuch as the percentage of flavor volatiles contained therein would be greater than that of the vapor entering the vapor inlet 22, it being understood that as the vapor rises within the concentrating chamber 30 the volatile materials of the vapor become more and more concentrated as liquid is condensed therefrom. Accordingly, conduit 60 enters chamber 30 at a point wherein the flavor volatile concentration is equivalent to that of the vapor flashed through the orifice 60. It will therefore be appreciated that where the evaporator 18' is not part of an essence recovery stage, the conduit 60 is merely connected to the bottom thereof.

The recovery section 46 of the recovery stage 12 will therefore be provided with a constant flow of the concentrated vapor fraction from the heat exchanger by it passing through a metering nozzle 62. The conduit 64 then delivers the vapor fraction to a condenser 66 of conventional design in order to remove from the flavor bearing vapor fraction a majority of the condensibles thereof. Accordingly, the condenser 66 includes a plurality of heat exchanging conduits 68 in communication between the inlet portion 70 of the condenser which is connected to the conduit 64 and the outlet portion 72. A water cooling inlet 74 is therefore in communication with a cooling jacket 76 disposed about the heat exchange conduits 68, the cooling water leaving the condenser 66 through an outlet conduit 78. The outlet portion 72 of the condenser 66 therefore delivers the flavor bearing condensibles, and non-condensibles from the vapor fraction to the delivery conduit 80, the delivery conduit 80 delivering the condensibles, and non-condensibles to a delivery chamber 82 of a concentrate stripping assembly generally indicated by reference numeral 84. The delivery chamber 82 is therefore in fluid communication with an essence container 86 while a check valve 88 preventing reverse flow, is positioned in the connecting conduit 90 which delivers to the container 86, the desired flavor components or essence by gravity feed. The collection within the delivery chamber 82 of the stripping assembly 84 will therefore be derived from delivery conduit 80 and from the fluid passing downwardly from the stripping assembly 84. Accordingly, in addition to the flavor constituents delivered by conduit 80 to the delivery chamber 82 of the stripping assembly 84, a reflux fluid which may be derived from the inlet vapor in inlet conduit 10 is also delivered to the stripping assembly 84 by conduit 94, the reflux vapor being metered and passed through the metering nozzle 95 for delivery to the top of the stripping assembly 84.

It will of course be apparent that the non-condensibles delivery to the delivery chamber 82 of the stripping assembly 84 will pass upwardly therefrom through heat exchanger 96 by means of the plurality of tubes 98 extending therethrough which communicates with the delivery chamber 82 and an intermediate chamber 100 disposed at the lower end of a stripping column 102. Accordingly, the heat exchanger 96 further condenses additional flavor volatiles which pass upwardly therethrough from the delivery chamber 82. A coolant inlet 104 is therefore provided for introducing cooling medium about the tubes 98 within the jacket casing 106 of the heat exchanger 96. The cooling medium is then delivered by conduit 108 to a cooling jacket 110 formed about the passage 112 for the stripping column portion 102 within which passage 112 there is disposed packing material within which counter current flow is accommodated as is well known by those skilled in the art in order to effect scrubbing of the non-condensibles with condensate for removal of any flavor bearing constituents in the non-condensibles. The remaining non-condensibles entering the chamber 100 after passing upwardly through the passage 112 of the stripping column from chamber 100 will enter the chamber 114 disposed above the stripping column portion 102. It will however be appreciated that reflux liquid will also be delivered to the chamber 114 for passage downwardly through the stripping column passage 112 in counter current flow to the rising non-condensible for removal of the flavor bearing non-condensible vapors. Accordingly, the metered reflux vapor is supplied to the inlet portion 116 of a condenser 118 which is cooled by means of the cooling medium passing from the outlet conduit 78 from the condenser 66 hereinbefore described which cooling medium is circulated within a jacket 120 of condenser 118 from which it is discharged through outlet conduit 122. The heat exchanger 124 further cools the reflux liquid. The cooling medium for heat exchanger 124 passes from the jacket 110 of the stripping column portion 102 through the conduit 126 into jacket 128 for the heat exchanger 124, from which cooling jacket the cooling medium is discharged through outlet conduit 130. Reflux liquid therefore enters the chamber 114 through the reflux fluid passage 132 in the heat exchanger 124. It will therefore be apparent that chamber 114 collects therein the non-condensible gas, free of flavor bearing constituents, from which chamber 114 the non-condensible gas is vented through the discharge conduit 52 of the stripping assembly 84. It will therefore be further apparent that by applying a regulated suction pressure to the discharge conduit 52, vapor flow through the entire recovery stage 12 may be effected.

The pressure regulating device 50 is therefore provided in order to generate the necessary pressure differential hereinbefore referred to of sufficient magnitude so as to cause fluid flow of the vapor. The pressure regulator device 50 therefore includes an accumulator chamber 134, which is connected at its bottom to the condensate conduit 48 by means of a connecting conduit 136 within which is disposed an orifice 138 whereby the static pressure of the accumulated condensate 140 in the accumulator chamber 134 may be communicated with the condensate in conduit 48 without any substantial mixing of the hot condensate flowing in conduit 48 with the cooler condensate 140. The discharge vent conduit 52 is connected to the accumulator chamber 134 below the level of condensate 140 therein. The distance of the vent inlet 53 to the accumulator above the conduit 48 will therefore determine the constant pressure drop through the recovery stage. This constant pressure differential is selected to prevent escape of flavors, yet sufficient to maintain flow through the essence recovery stage. The level of the accumulator condensate 140 will therefore be maintained above the exit end at 53 of conduit 52 by applying a vacuum pressure to the space 142 disposed above the condensate 140 by means of a vacuum generating equipment (not shown) connected to the space 142 by means of conduit 144. It will therefore be apparent that the pressure of the fluid discharge from the discharge conduit 52 may be regulated at any predetermined value below that of the vapor pressure at inlet 10 so as to cause flow of the vapor through the recovery stage 12 by vacuum pressure regulated to prevent loss of flavor constituents.

From the foregoing description, operation and utility of the process and apparatus will be apparent. Summarizing, however, it will be recalled that the essence bearing vapor delivered from an initial stage enters the heat exchanger 18, passes upwardly therethrough whereupon a more concentrated flavor vapor fraction is drawn outwardly therefrom through outlet vapor conduit 42. The flavor concentrated vapor fraction is delivered at a constant rate of flow to the condenser 66 which separates therefrom the majority of the condensible components. The vapor and a condensate mixture is then delivered by conduit 80 to a discharge chamber 82 of the stripping assembly 84. Also, delivered to the stripping assembly 84 is a reflux fluid derived preferably from the vapor inlet 10 and metered by metering nozzle 95 into the stripping assembly 84. Vapors from the delivery chamber 82 pass upwardly through the condenser 96; subsequently, the remaining non-condensibles through the stripping column portion 102 for removal of flavor bearing materials from the non-condensibles releasing non-condensible waste gas into the chamber 114. The reflux fluid passes into the condenser 118 for condensation thereof and to exchanger 124 for further cooling from which it is delivered to chamber 114 whereupon the reflux liquid passes through the stripping column portion 102 in counter current flow for scrubbing contact with the non-consibles. Accordingly, the flavor bearing materials are collected within the delivery chamber 82 for delivery to the essence container 86. The non-condensible waste gas on the other hand is received in the chamber 114 and vented through the discharge conduit 52 for delivery to the vacuum pressure regulating device 50 by means of which the desired pressure differential for the recovery process is maintained to effect flow of the vapors through the recovery stage. The condensate from the heat exchanger 18 may be recovered for delivery to a next stage of the system by being flashed through an orifice 54 whereupon additional vapor is released therefrom for delivery to the next stage heat exchanger 18' through the conduit 60 while the liquid is delivered thereto by conduit 56. Also, the liquid vapor mixture leaving the bottom of the heat exchanger 18 is separated by the separator 20 and the vapor phase may be delivered to the inlet of the next stage heat exchanger 18' while the further stripped liquid may be delivered by conduit 24 to the liquid inlet of the next stage heat exchanger 18'.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for recovering flavor concentrate from an essence bearing vapor separated from vapor stripped liquid comprising, spaced vapor and liquid inlets for respectively receiving said essence bearing vapor and said stripped liquid, heat exchanger means connected to said inlets for conducting a baffled flow of said essense bearing vapor in heat exchange relation to said stripped liquid and in counter-current flow relation to condensing condensate, a vapor outlet connected to said heat exchanger means for removal of a concentrated vapor fraction from said baffled flow of essence bearing vapor, stripping means, reflux means for delivering a metered flow of reflux vapor from the vapor inlet of the heat exchanger means, receiver means operatively connected to said stripping means for collecting flavor bearing condensate discharged therefrom, vent means operatively connected to the stripping means for withdrawing non-condensible gas therefrom, first condenser means operatively connecting the vapor outlet to the stripping means for condensing the vapor fraction into flavor bearing condensate and non-condensible gas delivered to the stripping means, second condenser means operatively connecting the reflux means to the stripping means for delivering reflux liquid to the stripping means in counter current relation to the non-condensible gas delivered thereto, and pressure regulator means operatively connected to the heat exchanger means and the vent means for producing a constant pressure differential maintaining flow of said vapor fraction and reflux vapor to the first and second condenser means.

2. The apparatus as defined in claim 1 wherein said pressure regulator means comprises liquid accumulator means connected to said heat exchanger means for receiving condensate therefrom, said vent means being connected to the accumulator means below condensate level therein and at a pressure drop height head above a discharge level of condensate from the heat exchanger means and a vacuum pressure source connected to said accumulator means for maintaining said condensate level within the accumulator means.

3. In a recovery stage having a vapor supply and a condensate supply at the same pressure, a flow metering device connected to said vapor supply, condensing passage means having an inlet connected to the metering device and an outlet through which non-condensible gas is removed, and pressure regulating means operatively connected to the outlet of the condensing passage means and to the condensate supply for maintaining continuous flow of fluid to the condensing passage means, said pressure regulating means including, a chamber receiving said non-condensible gas from said outlet, restrictive flow means connecting the chamber to the condensate supply for limited flow of condensate therethrough to maintain a variable level of said condensate in the chamber under a pressure lower than said pressure of the vapor and condensate supplies, a vent passage connecting said outlet of the condensing passage means to the chamber at a location always below the level of the condensate in the chamber thereby maintaining a constant pressure differential between the vapor supply and said outlet, and means connected to said chamber for maintaining the condensate therein at said pressure lower than the pressure of the vapor and condensate supplies.

References Cited by the Examiner

UNITED STATES PATENTS

| 1,956,390 | 4/1934 | Klotz | 261—121 |
|---|---|---|---|
| 2,457,315 | 12/1948 | Milleville | 202—69 |
| 2,510,233 | 6/1950 | Kermer | 159—17 |
| 2,513,813 | 7/1950 | Milleville | 99—205 |
| 2,625,505 | 1/1953 | Cross | 99—205 |
| 2,666,707 | 1/1954 | Beu | 99—205 |
| 2,714,573 | 8/1955 | Fessler | 202—69 |
| 2,729,564 | 1/1956 | Keller | 99—205 |
| 2,777,677 | 1/1957 | Bunch | 261—121 |
| 2,801,708 | 8/1957 | Fisher | 165—14 |
| 2,896,705 | 7/1959 | Ramen | 159—20 |
| 2,941,590 | 6/1960 | Rosenblad | 159—20 |
| 2,992,978 | 7/1961 | Kelly | 202—69 |
| 3,061,448 | 10/1962 | Mojonnier et al. | 99—205 |
| 3,065,085 | 11/1962 | Chirico | 99—205 |

FOREIGN PATENTS 265,517  2/1927  Great Britain.

NORMAN YUDKOFF, *Primary Examiner.*

ROBERT F. BURNETT, HERBERT L. MARTIN, GEORGE D. MITCHELL, *Examiners.*

F. E. DRUMMOND, M. S. SILVERSTEIN, C. SUKALO, *Assistant Examiners.*